United States Patent [19]

Imanaka et al.

[11] Patent Number: 4,841,402
[45] Date of Patent: Jun. 20, 1989

[54] THIN FILM MAGNETIC HEAD AND METHOD OF MANUFACTURE

[75] Inventors: Tadashi Imanaka; Masayuki Takagi; Eisei Togawa; Harunobu Saito; Sadanori Nagaike; Masaki Ohura, all of Odawara; Saburo Suzuki, Minamiashigara; Tetsuo Kobayashi, Ashigarakami; Shunichiro Kuwatsuka, Odawara, all of Japan

[73] Assignee: Hitachi, Ltd., Tokyo, Japan

[21] Appl. No.: 4,623

[22] Filed: Jan. 20, 1987

[30] Foreign Application Priority Data

Jan. 27, 1986 [JP] Japan .................................. 61-13807

[51] Int. Cl.⁴ .......................... G11B 5/12; G11B 5/30
[52] U.S. Cl. .................................. 360/126; 360/122; 360/125; 29/603
[58] Field of Search ............... 360/110, 119, 122, 123, 360/125, 126; 29/603

[56] References Cited

U.S. PATENT DOCUMENTS

| | | | |
|---|---|---|---|
| 4,190,872 | 2/1980 | Jones et al. | 360/125 |
| 4,219,854 | 8/1980 | Church et al. | 360/123 |
| 4,458,279 | 7/1984 | Katz | 360/123 |
| 4,511,942 | 4/1985 | Valstyn | 360/126 |
| 4,713,711 | 12/1987 | Jones et al. | 360/123 |
| 4,727,643 | 3/1988 | Schewe et al. | 29/603 |

FOREIGN PATENT DOCUMENTS

| | | | |
|---|---|---|---|
| 49-33648 | 9/1974 | Japan . | |
| 53-142214 | 12/1978 | Japan | 360/122 |
| 56-58124 | 5/1981 | Japan | 360/126 |
| 57-130222 | 8/1982 | Japan | 360/122 |
| 58-128012 | 7/1983 | Japan | 360/123 |
| 60-133516 | 7/1985 | Japan | 29/603 |
| 60-205812 | 10/1985 | Japan . | |
| 61-68717 | 4/1986 | Japan | 29/603 |
| 61-110320 | 5/1986 | Japan | 360/122 |

OTHER PUBLICATIONS

European Patent Office No. 0150372 A1 dated Aug., 1985, Chinese Patent Office Action w/translation.

Primary Examiner—John H. Wolff
Attorney, Agent, or Firm—Antonelli, Terry & Wands

[57] ABSTRACT

A thin film magnetic head having two conductor layers provided within a magnetic circuit constituted by a first and a second magnetic member. The magnetic circuit has, at the side to which a recording medium is opposed, a portion where the first and second magnetic members are opposed to each other over a length substantially equal to a gap depth, intervening a non-magnetic gap member therebetween, and a portion ahead thereof where they are connected with each other. The edge of the gap member constitutes an aperture of the magnetic circuit. The thin film magnetic head arranged as above permits a high density recording without reducing its production yield.

9 Claims, 2 Drawing Sheets

THIN FILM MAGNETIC HEAD AND METHOD OF MANUFACTURE

BACKGROUND OF THE INVENTION

This invention relates to a thin film magnetic head and more particularly to a thin film magnetic head having a multi-winding coil and a narrow gap depth, which is preferably adapted to a high density recording/reproducing.

In recent years, the high density recording in disk devices and the like has been eagerly demanded. In order to meet this demand, first, the recording density in a track width direction is increased. However, this leads to a problem of the reduction of a single reproduction output since the track width is reduced. To overcome this problem it is necessary to increase the number of windings of a conductor coil in a limited area. Further, to meet the above demand, the recording frequency is also increased to increase the line recording density. But, this also leads to the same problem. Moreover, the disk device, etc. are miniaturized. This also gives rise to the same problem since the relative speed between a recording medium and the head is reduced. Thus, now, the magnetic head having a more improved performance is required to obviate the reduction of a single reproduction output.

To prevent the reduction of a reproduction output resulting from the increase of the recording density, it is usual to give a larger coersive force to a recording medium. This requires a thin film magnetic head having such a structure as to increase the recording magnetic field. To obtain such a head, it has been proposed to increase the gap length and core thickness while decreasing the gap depth. When gap length and the core thickness are increased, however the reproduction output is inclined to be decreased in a high frequency range. This is not preferable. Thus, it is necessary to decrease the gap depth more greatly than before.

In order to prevent the reproduction signal output reduction resulting from the decrease of the relative speed between the recording medium and the magnetic head, it is also necessary to make many windings of a conductor coil in a limited area as in the case where the track width is reduced as mentioned above.

A previously known typical thin film magnetic head has eight windings of a substantially elliptical conductor coil for the purpose of a higher recording/reproduction as before. Such a thin film magnetic head is disclosed in JP-A-No. 55-84019 corresponding to U.S. Pat. No. 4,190,872 filed in 1978 and JP-A-No. 55-84020 corresponding to U.S. Pat. No. 4,216,854 filed in 1978. However new problems posed by such a magnetic head, are not proposed in those patent applications.

The problems newly posed are follows.

In the case where many windings are wound in a single layer conductor (coil) structure in a limited area, the coil resistance is increased. To prevent this, the coil thickness must be increased and the coil intervals must be decreased. To provide the coil with an increased thickness, the photoresist used when they are formed must be also increased in its thickness. However, it is difficult to pattern the thick photoresist and so the thick coil with a high accuracy during the production process. The short-circuiting between the coil windings may frequently occur because of any alien substance mixed between the coil windings since the coil intervals are short. This leads to the reduction of a production yield of the head. Further, in the aforesaid case, the area of the region connecting the central portion of spiral windings with an external circuit must also be decreased. However, it is difficult to form such a connection region in a decreased area with less variation. Thus, the connection resistance may vary while the head is being used so that a stabilized recording/reproduction characteristic can not be provided. This is a serious problem in the reliability of the head.

One structure for making many windings of a conductor in a limited area is proposed in Japanese Patent Publication No. 49-33648. In this structure, many layers of a conductor having a wide width are stacked on a substrate through individual insulating, layers. However, a great many layers must be stacked in order to obtain a satisfactory characteristic of the head. This provides an undesired increase of the number of fabrication steps.

Another structure is a multi-layer multi-winding constructor structure as disclosed in JP-A-No. 56-8124. If the number of conductor layers is increased as in this structure, the plane where the coil windings are formed becomes higher. This makes it difficult to form the individual coil windings, with a high accuracy, on the entire surface of the substrate. Since a second magnetic member is formed at a higher step displacement portion in a subsequent step, the provision of a track width with a high accuracy is also made difficult. Further, the window within a magnetic yoke is heightened and the end point of the gap depth, which is determined by etching, at the side opposed to the medium, the insulator within the magnetic yoke, is formed with a decreased accuracy. This gives rise to the variations in the gap depth. The slope portion of the insulator on the side of the magnetic yoke is also difficult to manufacture so that it can have a predetermined angle of the slope and size between the conductor and the magnetic member because of the excess or shortage of etching. Thus, the desired recording characteristic and insulating property between the conductors and magnetic members may vary or can not be obtained. Therefore, the number of the conductor layers is required to be limited so that their many windings can be made without increasing the height of the window within the magnetic yoke.

Still another structure is a two-layer multi-winding conductor structure as shown in JP-A-No. 60-133516 corresponding to U.S. Pat. application Ser. No. 684,300 filed in 1984. This structure does not take into consideration the aforesaid problems and also the following problem posed when a small gap depth is intended to be provided with a high accuracy. More specifically, in order to obtain the head with a predetermined depth, the gap depth, which can be decided by machining the head surface opposed to the recording medium, must be measured through a thick protection film from the side where a head element is to be formed. Therefore, the gap depth of approx. 1 $\mu$m or less is difficult to measure with a high accuracy. Namely, the small gap depth is difficult to obtain and may vary, thus making it difficult to provide a stabilized and satisfactory electro-magnetic conversion characteristic.

Further, a method of manufacturing a thin film magnetic head with a small gap depth is disclosed in JP-A-No. 61-32212 corresponding to U.S. Pat. No. 4,749,439 filed in 1985.

SUMMARY OF THE INVENTION

An object of this invention is to provide a magnetic thin film head which is capable of providing a stabilized high electro-magnetic conversion characteristic by making many windings of conductors in a magnetic yoke with a limited size without decreasing the production yield.

Another object of this invention is to provide a thin film magnetic head which is suited for a high density recording, has a highly reliable conductor structure and has a small and very accurate gap depth.

To attain these objects, in accordance with this invention, there is provided a thin film magnetic head comprising a structure consisting of two conductor layers which crosses a closed magnetic yoke or circuit consisting of a first and a second magnetic member, wherein said first and second magnetic member are connected with each other to form the closed magnetic yoke at its front portion which is opposite to a recording medium and at its rear portion which is not opposite thereto, and have portions which are opposite to each other over a length substantially equal to a gap depth, intervening a non-magnetic gap member therebetween, on a plane substantially parallel to a substrate surface at least at said front portion, and the edge of said gap member constitutes an aperture of the magnetic yoke.

BRIEF DESCRIPTION OF THE DRAWINGS

Prior to explaining the preferred embodiments of this invention, the operation of this invention having the construction mentioned above will be described. In accordance with this invention, the window height within a magnetic yoke can be prevented from being increased by arranging conductor members in a two-level multi-winding structure. Therefore, the aforesaid problems associated with the increase of the window height are minimized. Adequacy of arranging the conductors in a two-layer multi-winding structure will be explained. Assuming that the width L where conductor windings 60 are to be inserted is fixed in FIG. 5, it is necessary to set the interval S between the conductor windings and the interval T between the conductor layers for predetermined sizes in order to assure a satisfactory production yield of heads through the fabrication process. The number of windings of the conductor that can be wound in a prescribed space, with their sectional area fixed, will be explained. Assuming that $L \approx 80$ $\mu$m, $S \approx 1.5$ $\mu$m, $T \approx 1.5$ $\mu$m and the window height in the magnetic yoke $H \approx 9$ $\mu$m, FIG. 4 shows characteristic curves of the number of windings which can be wound vs. their sectional area for respective conductor structures of one to three layers. In FIG. 4, A relates a single layer structure with the film thickness of approx. 5 $\mu$m; B relates to a two-layer structure with the film thickness of approx. 1.7 $\mu$m; C relates to a three-layer structure with the film thickness of approx. 0.7 $\mu$m; and D relates to a single layer structure of the film thickness of approx. 3 $\mu$m. As seen from the figure, if the conductor sectional area is the same, the two-layer structure B can make more windings than the three-layer structure C. The single layer structure A can make more windings than the two-layer structure B when the conductor sectional area is greater than approx. 8 $\mu$m. However, since this single layer structure A has a film thickness as large as approx. 5 $\mu$m its fabrication is very difficult. On the other hand, when the single layer structure (D in FIG. 4) having a film thickness of approx. 3 $\mu$m which is a realizable upper limit is compared with the two-layer structure B, it can be seen that the latter structure can make more windings than the former structure. Further, even if the number of conductor layers is different, the conductor resistance is not substantially varied if the number of windings is fixed. Therefore, when the respective conductor structures having the same number of windings and the realizable film thickness are compared, it can be seen that the two-layer structure B can take the largest conductor sectional area. The same result can be provided (not shown) when the two-layer structure is compared with a structure having four or more conductor layers. However, using the structure having more conductor layers is not preferable since it requires so more steps of fabrication. Moreover, even when the values of L, S, T and H are varied to the extent allowed by the production yield of the magnetic heads, viewed from the magnetic circuit efficiency, conductor short-circuitings, etc. is not so seriously deteriorated because the relations among the characteristics shown in FIG. 4 are not almost varied. Accordingly, it should be understood that the two-layer conductor structure is a structure which is most suitable to assure the sectional area necessary for the reliability of the head and to make the desired number of windings of conductors.

Figure 1:
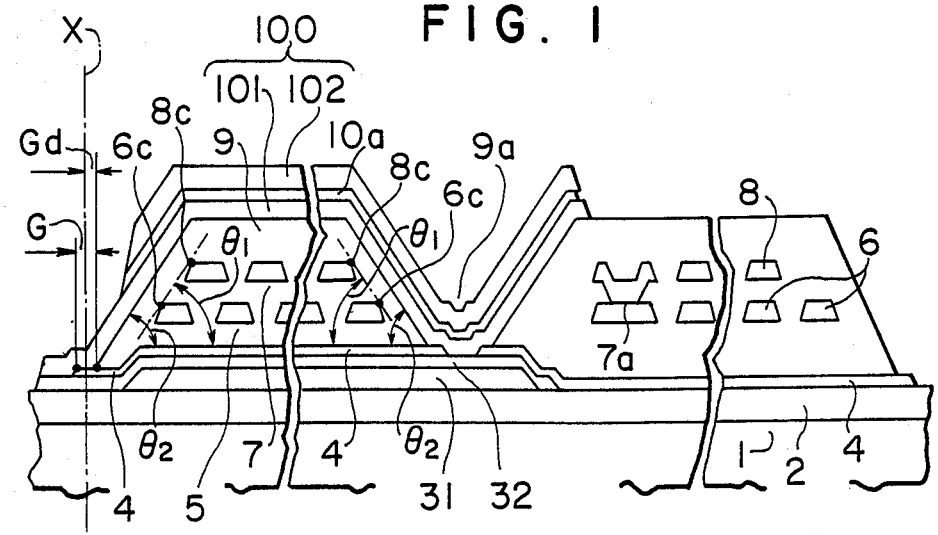
FIG. 1 is a central sectional view of a thin film magnetic head according to one embodiment of this invention.

In this invention, the center of each of the respective windings of a second conductor member 8 located in a magnetic yoke is located substantially just above each of the centers between the respective windings of a first conductor 6, and the angle $\theta_1$ formed by the line connecting the upper surface edges of the first and second conductors and the plane substantially parallel to a substrate surface is made substantially equal to the angle $\theta_2$ formed by a side slope of a second magnetic member 101 and the plane parallel to the substrate surface. Therefore, many windings of conductors can be effectively wound within a limited area of the magnetic yoke, and a third insulater 9 can be formed so that the smoothness of the surface thereof at the regions constituting the front portion and the rear portion of the magnetic yoke is prevented from being reduced and the slope angle thereof on the side of the magnetic yoke is stably set for a predetermined angle. Thus, there can be provided a magnetic head which has uniform sizes between the conductors and the second magnetic member, less variation of the insulating property between the conductor members and the second magnetic member, and stabilized recording property.

Moreover, in this invention, the first 30 and second 101 magnetic members have portions which are opposite to each other over a length substantially equal to a predetermined small magnetic gap depth provided by an intervening a gap member therebetween, at least on their sides opposite to a recording medium, and are connected with each other ahead of the above portions. Therefore, by monitoring the state of the connection portion from a machining side, the point where the connection portion is removed by machining and also the gap member is completely exposed can be defined as machining ending point, thus making it unnecessary to measure the gap depth from the side where a head element is to be formed. Accordingly, in accordance with this invention, a head structure which has a highly accurate and small-sized gap depth can be implemented.

DESCRIPTION OF THE PREFERRED EMBODIMENTS

Now referring to FIGS. 1 to 3, embodiments of this invention will be explained.

Embodiment 1

Figure 2:
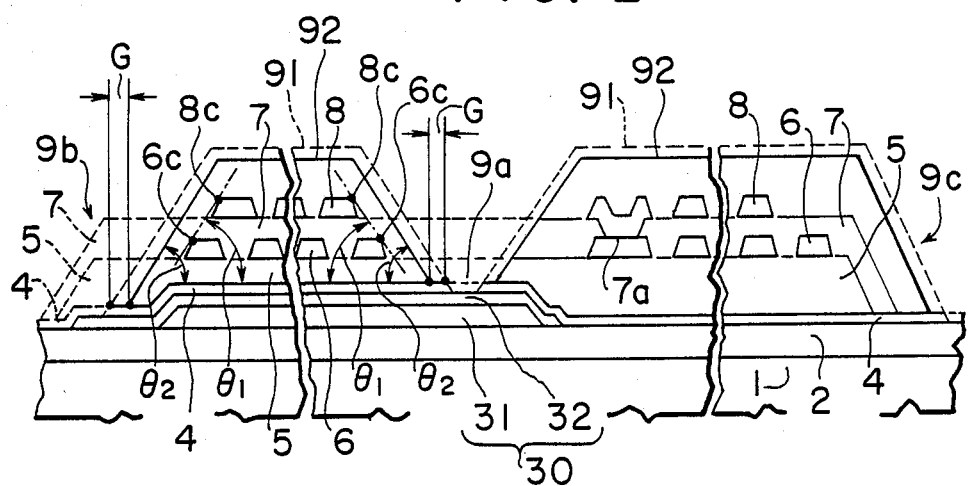
FIG. 2 is a central sectional view in a certain step of the process of fabricating a magnetic thin film head according to one embodiment of this invention.

FIG. 1 shows a central section of a head element which has been completed in this embodiment. FIG. 2 shows a central section of the head element at the half-way step.

First referring to FIGS. 2 and 3 and thereafter FIG. 1, the fabrication process of the head element in accordance with this embodiment will be explained.

First, on a substrate 1 formed is an underlying film 2 of e.g. alumina which constitute a base on which a head element is to be formed.

A first magnetic member 30 of e.g. permalloy which is thinner at its medium opposing side 9b and thicker at its side reverse thereto 9a is formed on the underlying film 2. This first magnetic member 30 consists of a first layer 31 and a second layer 32 which are successively deposited on the underlying film 2 through e.g. a sputtering technique and thereafter etched through sputtering.

A non-magnetic gap member 4 of e.g. alumina which will be machined later to constitute a gap member is deposited on substantially the entire surface of the underlying film 2, including the first magnetic member 30, through e.g. the sputtering technique.

A first insulator member 5 is formed on the gap member 4 over the region having a larger area than the region where a first conductor member 6 is to be formed. This first insulator member 5 has a flat and smooth surface and is formed by applying an insulator of polyimide system resin, etc. on the gap member 4, patterning it and baking the patterned insulator.

A first conductor member 6 of e.g. copper is formed on the first insulator 5. Each of the windings of this first conductor member 6 has thin contact layers of e.g. chrome deposited on its lower surface 6a as shown in FIG. 3.

A second insulator member 7 is formed so that it covers the first insulator member 5 and the conductor member 6 and provides a connection part 7a electrically connecting the first conductor member 6 and a second conductor member 8. This second insulator 7 has a flat and smooth surface and is formed through the application of insulator of e.g. polyimide system resin, patterning and baking thereof.

A second conductor member 8 of e.g. copper is formed on the second insulator member 7. Each of the windings of this second conductor 8, like the first conductor member 6, has thin contact layers of e.g. chrome deposited on its lower surface 8a as shown in FIG. 3. Then, the second conductor member 8 is arranged so as to have the following positional relationship with the first conductor member 6. Namely, the center of each of the windings of the second conductor member 8 is located substantially just over the central position between the windings of the first conductor member 6 in a magnetic yoke, and also is located substantially just over the center of each of the windings of the first conductor member 6 in the part behind the connection portion 7a. Further, an angle $\theta_1$ is made substantially equal to an angle $\theta_2$ as seen from FIG. 2; the angle $\theta_1$ is formed by the plane substantially parallel to the substrate surface and the line connecting the respective upper surface edges (6c and 8c) of the first and second conductor members 6 and 8, at their side in proximity to a second magnetic member 100 (FIG. 1) in the magnetic yoke, and the angle $\theta_2$ is formed by the plane substantially parallel to the substrate surface and the side slope of the second magnetic member 100 (the slope formed by simultaneously etching the first to third insulator members).

Thereafter, a third insulator member 9 is formed so that it covers the second conductor member 8. This third insulator member 9 is formed by applying insulator of e.g. polyimide resin onto the second conductor member 8; at the medium opposing side 9b and at the portion where the first magnetic member 30 is connected with the second magnetic member 100, etching the applied insulator together with both the first insulator member 5 and the second insulator member 7, and also at the back portion 9c, etching the applied insulator 9 so as to cover the second insulator 7; and hardening the etched insulator.

The gap member 4 is patterned using the third insulator 91 as a mask and this third insulator member 91 is also etched to form another third insulator member with the thickness reduced by size G in the horizontal direction. Then, the angle $\theta_2$ of the aforesaid slope may preferably 30°–45° in view of the deposition state of the first layer 101 (FIG. 1) of the second magnetic member 100 on the slope and the magnetic property of the head.

Next, as seen from FIG. 1, a second magnetic member 100 consisting of a first layer 101 and second layer 102, which is thinner at its medium opposing side 9b and thicker at its side reverse thereto 9a, is formed on the third insulator member 91. This second magnetic member 100 is formed by successively depositing the first layer 101 of e.g. permalloy, an intermediate film 10a of e.g. alumina and the second layer 102 of e.g. permalloy through e.g. the sputtering technique and thereafter etching the second layer 102 and the first layer 101 in this sequence also through e.g. the sputtering technique. Then, the first layer 101 is formed so as to have a thickness larger than the second layer 32 of the first magnetic member 30. The etching of the first layer 101 is performed, when it is patterned, using, as a mask, non-magnetic material of e.g. alumina which doesn't pose any problem even if it is used as a head constituent in order to provide a precise track width at the step displacement portion. Namely the intermediate film 10a acts as an etching stopper for the first layer 101 of the second magnetic member so that it can prevent the first layer 101 from being excessively etched. Incidentally, when the magnetic members are deposited through the sputtering technique, the substrate must be heated at a higher temperature during the deposition in order to provide the magnetic members with a uniform and high performance so that the insulator members used in the fabrication process may be preferably resin of polyimide system which has an excellent heat resistance property.

A thick protection film (not shown) of e.g. alumina is formed on the second magnetic member 100 to provide input/output terminals for connection of an external circuit.

Finally, as shown in FIG. 1, the medium opposing side is removed by machining to provide a predetermined gap depth $G_D$.

The magnetic head fabricated by the process mentioned above can provide a very accurate track width which is an effect peculiar to this embodiment. It has been confirmed that the thin film magnetic head in accordance with this invention has a high performance and high reliability and so can be suitably applied to a high density recording.

Embodiment 2

Figure 3:
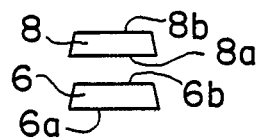
FIG. 3 is a sectional view for explaining conductor coils.
Figure 4:
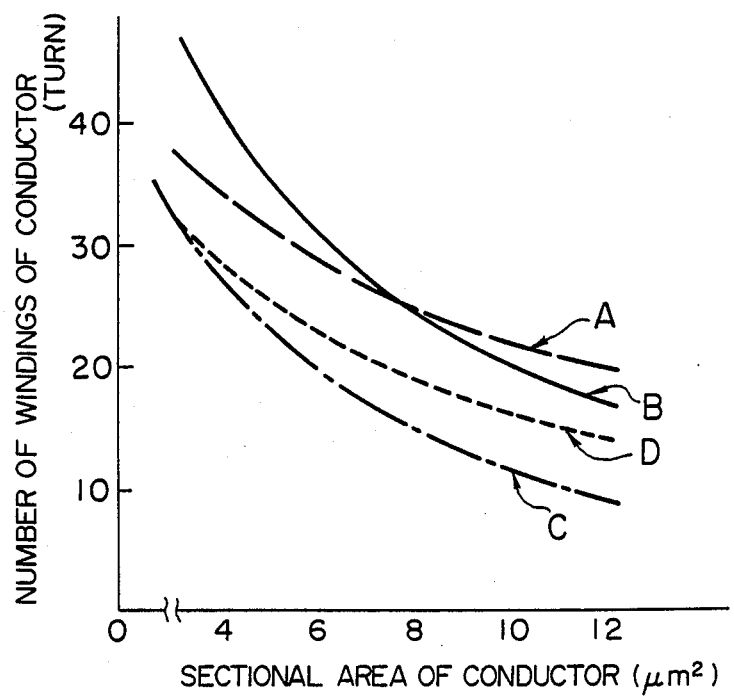
FIGS. 4 and 5 are a graph and a sectional view for explaining the operation of this invention, respectively.
Figure 5:
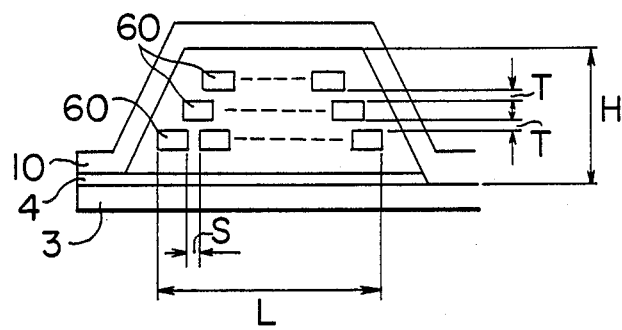

In Embodiment 1, the thin contact layers of e.g. chrome have been formed on the upper and lower surfaces of the first conductor member 6 and the second conductor member 8, as shown in FIG. 3. In accordance with Embodiment 2, the upper contact layer of the first conductor 6 is removed through e.g. the sputter-etching technique after an aperture which constitutes a connection part 7a of connecting the first conductor member 6 and the second conductor member 8 has been formed. In Embodiment 2, the contact layers are arranged on both upper and lower surfaces 6b and 6a of the first and second conductor members so that the reliability of the conductor members can be further enhanced. When the contact layer is removed from the upper surface 6b of the first conductor member 6 (at a connection part 7a), the time when the etching is to be terminated can be easily decided from the appearance of the upper surface of e.g. copper of the first conductor member.

It has been confirmed that the thin film magnetic head according to this embodiment has the same performance as in Embodiment 1.

Embodiment 3

In this embodiment, an inorganic film of e.g. $SiO_2$ is adopted for the first to third insulator members 5, 7 and 9 in Embodiment. This inorganic insulator film is formed so as to have a flat and smooth surface through several techniques of sputtering, lift-off, bias-sputtering, etc. Its shape having slopes of angle $\theta_2$ is formed through techniques of reactive sputter-etching, plasma etching, etc. The inorganic insulator films according to this invention further enhances the reliability of the magnetic head of this invention since it has a high heat resistance.

It has been confirmed that the magnetic head in accordance with this embodiment has also the same performance as in Embodiments 1 and 2.

This invention has the following meritorious effects.

The multi-winding of conductor coils can be implemented in such a way that the resistance thereof is prevented from being increased without reducing the sectional area of each of the conductor coils, thereby enhancing of the reliability the resultant magnetic head, and preventing the reproduction output from being decreased.

Since the positional relationship between the windings of each conductor and the second magnetic member and the angle of each of the slopes on the sides of the magnetic yoke are stabilized, a magnetic head having good insulation between the conductor members and the magnetic members and an excellent recording property can be realized.

Since the small-sized gap depth $G_D$ can be provided with a high accuracy, the reduction of the reproduction output, which is associated with the increase of the recording frequency, is prevented, thereby making uniform the electro-magnetic characteristic of the magnetic head. Thus, the magnetic head having a high performance and reliability can be made with a high production yield.

We claim:

1. A thin film magnetic head comprising:
   a substrate (1) having a planar surface;
   a first magnetic member (30) formed on said substrate;
   a non-magnetic gap layer (4) formed on said first magnetic member;
   a first insulator member (5) formed on said gap layer;
   a layer of a first conductor member (6) of spiral windings of electrically conductive material formed on said first insulator member and having an outer surface edge;
   a second insulator member (7) formed on said first conductor member;
   a layer of a secondcconductor member (8) of spiral windings of electrically conductive material formed on said second insulator member and having an outer surface edge, said second conductor member being electrically connected with said first conductor member to constitute a two-layered conductor coil;
   a third insulator member (9) formed on said second conductor member; and
   a second magnetic member (101) formed on said third insulator member arranged to extend on edges of said first, second and third insulator members along a straight line having a slope and on a portion of said gap layer and being in contact with said first magnetic member to constitute a magnetic path; wherein
   the relative arrangement of said first and second conductor members (6, 8) within a space defined by said gap layer (4) and said second magnetic layer (101) is such that an angle $\theta_1$ formed between a reference plane substantially parallel with the substrate surface and a line connecting the surface edges (6c, 8c) of the cross-sections of said first and second conductor members (6, 8) taken on a plane perpendicular to the substrate surface is substantially equal to an angle $\theta_2$ formed between said reference plane and a side slope of said second magnetic member (101), and
   each of said angles is in a range of from about 30° to 45°.

2. A thin film magnetic head according to claim 1, in which the relative arrangement of said first and second conductor members (6, 8) within said space is further such that a center of a cross-section of each of winding of said second conductor member (8) taken on said plane perpendicular to said substrate surface is located substantially above a center between cross-sections of a nearest two underlying windings of said first conductor member (6) taken on said plane perpendicular to said substrate surface.

3. A thin film magnetic head according to claim 2, in which edges of said first, second and third insulator members on which said second magnetic member (101) is formed, are substantially continuous to form a flat planar surface.

4. A thin film magnetic head according to claim 3, in which an edge of the first insulator member (5) overlying said gap layer (4) is spaced back from an edge of said gap layer which is adapted to abut a recording medium.

5. A method for fabricating a thin film magnetic head comprising the steps of:
   forming a first magnetic member on a substrate having a planar surface;
   forming a non-magnetic gap layer on said first magnetic member;
   forming a first insulator layer on said gap layer;
   forming a layer of a first conductor of spiral windings of electrically conductive material which have an outer surface edge on said first insulator layer;
   forming a second insulator layer on said first conductor member;
   forming a layer of a second conductor of spiral windings of electrically conductive material which have an outer surface edge on said second insulator layer, said second conductor being electrically connected with said first conductor to constitute a two-layered conductor coil;
   forming a third insulator layer on said second conductor layer;
   patterning said first, second and third insulator layers;
   etching said gap layer to a predetermined pattern;
   forming a second magnetic member on said patterned third insulator layer, along a side slope on said insulator layers and on a portion of said gap layer in such a manner that said portion of said etched gap layer is sandwiched between said first and second magnetic members to constitute a gap for said magnetic head, said first and second magnetic members being in contact with each other to constitute a magnetic path for magnetic flux generated by said conductor coil; and
   grinding that side of the resulting structure which includes said portion of said etched gap layer sandwiched between said first and second magnetic members; wherein
   said patterning step includes etching said first, second and third insulator layers simultaneously;
   said formation of said first and second conductor layers of spiral windings is such that an angle $\theta_1$ formed between a reference plane substantially parallel with the substrate planar surface and a line connecting surface edges of cross-sections of said first and second conductor members taken on a plane perpendicular to the substrate surface is substantially equal to an angle $\theta_2$ formed between said reference plane and the side slope of said second magnetic member on said simultaneously etched insulator layers; and
   each of said angles is in a range of from about 30° to 45°.

6. A method according to claim 5, in which said formation of said first and second conductor layers of sprial windings is further such that the center of the cross-section of each winding of said conductor taken on said plane perpendicular to said substrate surface is located substantially above the center between the cross-sections of nearest two underlying windings of said first conductor taken on said plane perpendicular to said substrate surface.

7. A method according to claim 5, wherein said etching of said gap layer is effected with said patterned third insulator layer used as a mask such that edge of the resulting gap layer which is to be later ground is spaced back from the underlying edge of said first magnetic member.

8. A method according to claim 5, wherein said patterned third insulator layer is further etched so that the edge of the resulting third insulator layer overlying the edge of said etched gap layer which is to be later ground is spaced back from said edge of etched gap layer.

9. A method according to claim 5, wherein said second magnetic member is formed by sputtering to control the formation of the angles $\theta_1$ and $\theta_2$.

* * * * *